United States Patent [19]

Nemit

[11] 3,964,066

[45] June 15, 1976

[54] ELECTRONIC SCANNED CYLINDRICAL-ARRAY ANTENNA USING NETWORK APPROACH FOR REDUCED SYSTEM COMPLEXITY

[75] Inventor: Jeffrey T. Nemit, Canoga Park, Calif.

[73] Assignee: International Telephone and Telegraph Corporation, New York, N.Y.

[22] Filed: Jan. 2, 1975

[21] Appl. No.: 538,193

[52] U.S. Cl. .......................... 343/100 SA; 343/854

[51] Int. Cl.[2] .......................... H04B 7/00

[58] Field of Search .......................... 343/100 SA, 854

[56] References Cited

UNITED STATES PATENTS

| | | | |
|---|---|---|---|
| 3,329,897 | 7/1967 | Preble | 343/854 |
| 3,531,803 | 9/1970 | Rosen et al. | 343/100 SA |
| 3,573,837 | 4/1971 | Reindel | 343/854 |
| 3,653,057 | 3/1972 | Charlton | 343/854 |
| 3,707,719 | 12/1972 | Mark | 443/1003 A |
| 3,816,830 | 6/1974 | Giannini | 343/100 SA |
| 3,824,500 | 7/1974 | Rothenberg | 343/100 SA |
| 3,827,055 | 7/1974 | Bogner et al. | 343/854 |
| 3,836,970 | 9/1974 | Reitzig | 343/100 SA |

*Primary Examiner*—Maynard R. Wilbur
*Assistant Examiner*—T. M. Blum
*Attorney, Agent, or Firm*—William T. O'Neil

[57] ABSTRACT

An electronic scan system with excitation arrangement for producing a directive radiation pattern from a circular or cylindrical array at a predetermined pointing angle.

The circular or cylindrical array provides random beam pointing. An RF input-output port feeds an equal amplitude distribution network providing as many outputs as there are elements of the array employed at any given time. An equal number of phase shifters is included, and gross beam positioning is effected through selection of the contiguous element group to be excited by means of RF switching. The phase shifters may then be controlled to provide the specific beam pointing or scan desired within the selected sector. The antenna elements of the array are fed through a passive interconnecting matrix responsive thereto, said matrix providing inherent amplitude taper across the effective aperture. The passive interconnecting matrix replaces the more complicated and expensive "ordering" matrix employed in prior art systems of the same general type.

12 Claims, 5 Drawing Figures

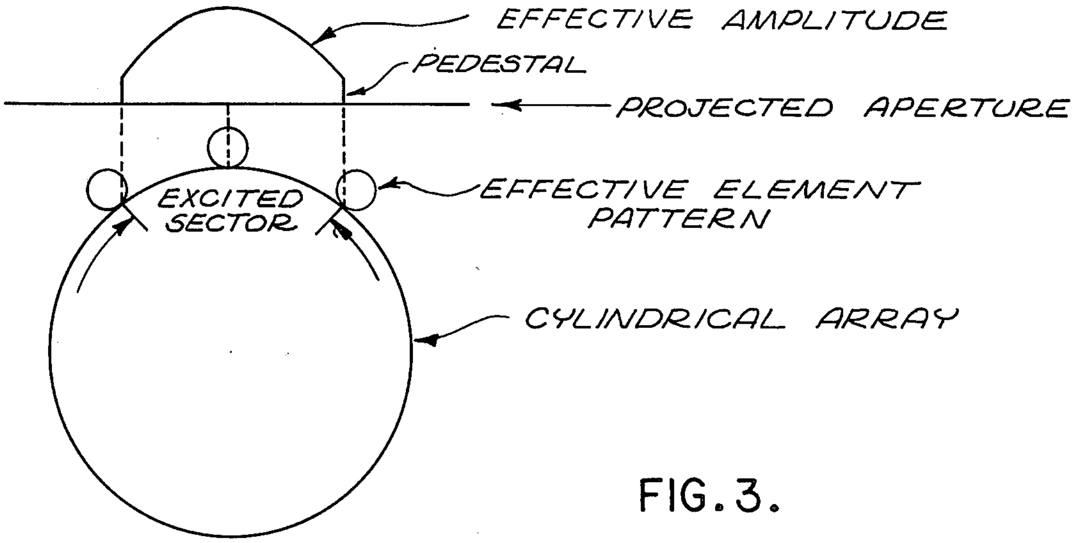
FIG. 3.
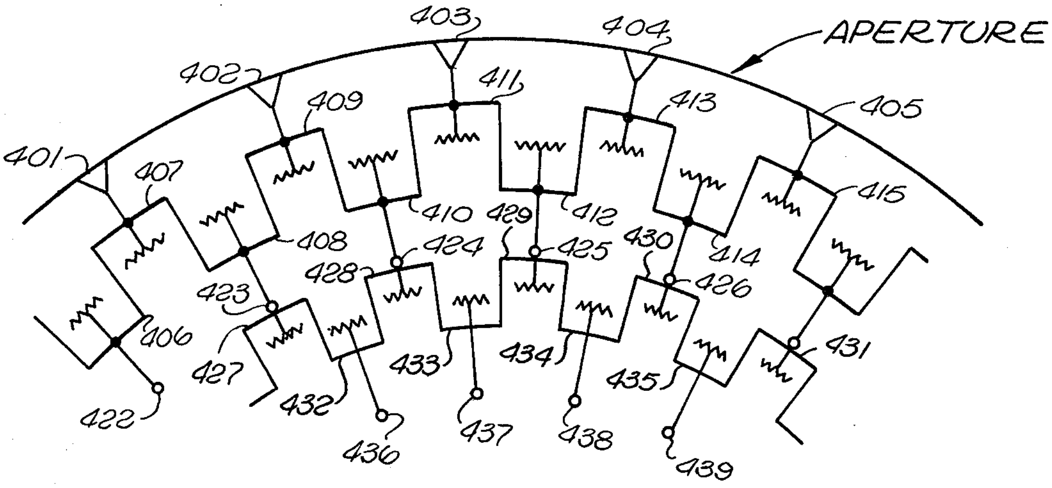
FIG. 4.
FIG. 5.
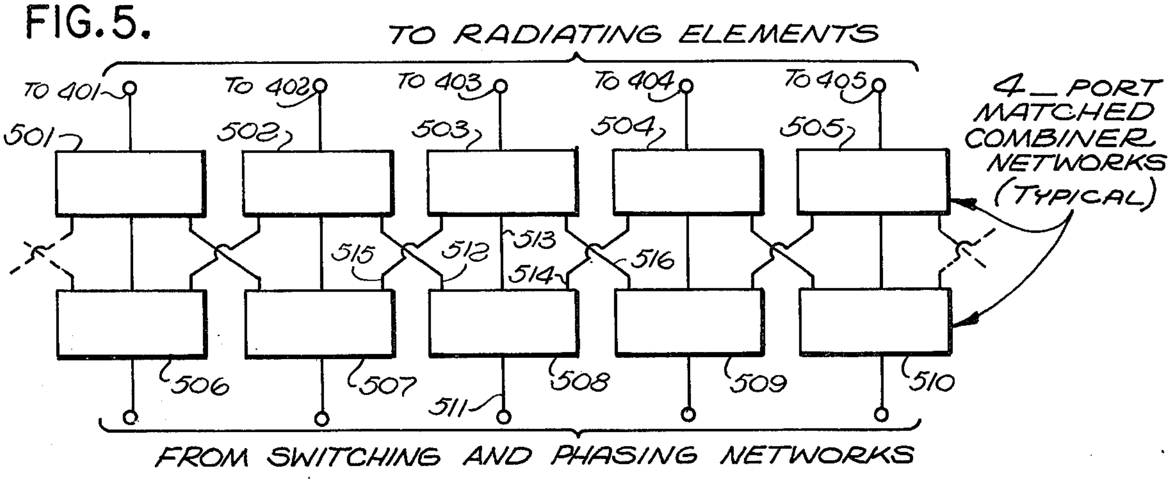

ELECTRONIC SCANNED CYLINDRICAL-ARRAY ANTENNA USING NETWORK APPROACH FOR REDUCED SYSTEM COMPLEXITY

BACKGROUND OF THE INVENTION

1. Field of the Invention

The invention applies to radar systems generally and more specifically to inertialess electronic scan array arrangements permitting random beam positioning over as much as 360° of azimuth coverage.

2. Description of the Prior Art

In the prior art, basic arrangements for beam scanning in a radar system are relatively well developed and known and their utility well established. The text "Radar Handbook" by Merrill I. Skolnik, (McGraw Hill 1970), provides a relatively current appraisal of the state of this art, generously supported by bibliographic references.

One of the oldest and most familiar methods of scanning a space in azimuth involves the use of a mechanically rotating directive antenna arrangement. Such expedients are widely used in so-called PPI radar systems, since they provide for the generation of beam patterns having required directivity and other characteristics, such as side-lobe level control. Moreover, that approach produces a beam pattern in space which is substantially of unvarying shape at all angles of scan. The principal disadvantage of the mechanically rotating antenna is, however, that it provides a very low data rate. Also, it does not have the capability of addressing any azimuth angle on a random basis, a feature which may be required for certain more advanced applications of radar systems.

Electronically scan arrays as a class generally can be made to fulfill all the requirements for rapid uniform beam shape scanning and for random angle address.

Obviously, a set of three or more planar phased arrays of known type can provide up to 360° of scan, but such arrays inherently provide some beam distortion over their useful angles of scan.

The electronically scanned cylindrical array, however, is the logical choice for generating a beam pattern which does not distort with azimuth scan, and yet affords the speed and random address features and all the other flexibilities of inertialess scan. In the cylindrical array, the excited portion of the aperture may be rotated in synchronism with the beam to maintain the symmetry which preserves the beam pattern throughout the desired range of azimuth angles.

In the prior art, several network techniques are available for providing this synchronous rotation. In the so-called "Modal" approach, a complete Butler Matrix is used, together with a separate phase shifter for each circumferential element. That prior art approach is described in the technical literature, including an article by W. Korvin entitled "Latest Word in Space Talk; It Can Come From Anywhere" (Electronics Magazine PP 117–126, May 3, 1966), and also in an article by G. Shelet, entitled "Matrix Fed Cylindrical Array For Continuous Scanning", IEEE 1968, G-AP International Symposium Program and Digest, PP 7–9, September 1968.

Another approach, sometimes referred to as the "Switching-and-Phasing Technique" provides a large reduction in the number of phase shifters required because of the introduction of switching for coarse selection of the angular sector of interest, but still requires a relatively complicated sector-ordering matrix. That prior art approach has also been described in the technical literature, including an article by R. J. Gianini, entitled: "An Electronically Scan Cylindrical Array Based On A Switching-and-Phasing Technique", (IEEE 1969 G. A. P. International Symposium Program and Digest, PP 199–201, December 1969).

Additional discussion of prior art aspects of the equipment is included hereinafter in connection with the description of the preferred embodiments, so that reference to figures of the drawing may be made in that connection.

The manner in which the present invention provides for simpler and less costly instrumentation of the electronically scanned cylindrical array will be understood as this description proceeds.

SUMMARY OF THE INVENTION

In accordance with the foregoing discussion of the prior art and its disadvantages, it may be said to have been the general objective of the present invention to produce an electronically scanning cylindrical array radar system of reduced complication and cost, and therefore of great utility in this art.

In accordance with the invention, a system will be described which provides the same reduction in number of phase shifters and sector-selection switches as the hereinabove mentioned "Switching-and-Phasing" technique. The combination of the invention employs a passive interconnecting network feeding the circumferential array elements in lieu of the more complex sector-ordering matrix commonly used in such systems. As this description proceeds, it will be seen that this passive interconnecting network, or matrix, also provides for a predetermined amplitude taper on the projected aperture, this (for example) being a cosine, cosine-on-a-pedestal, cosine squared, or a cosine-squared-on-a-pedestal amplitude taper. The description comprises three particularly described variations of the matrix arrangement of the present invention.

The detailed manner of instrumentation of typical embodiments of the present invention will be understood from the description hereinafter.

BRIEF DESCRIPTION OF THE DRAWINGS

FIG. 3 illustrates a typical amplitude taper across the aperture of an array in accordance with FIG. 2.

FIG. 4 is a detail illustrating the instrumentation of the passive interconnecting matrix of FIG. 2 in two alternative forms.

FIG. 5 is an illustration of the instrumentation of an additional variation of the matrix of FIG. 2 employing standard four-port matched combiner networks.

DESCRIPTION OF THE PREFERRED EMBODIMENTS

Figure 1:
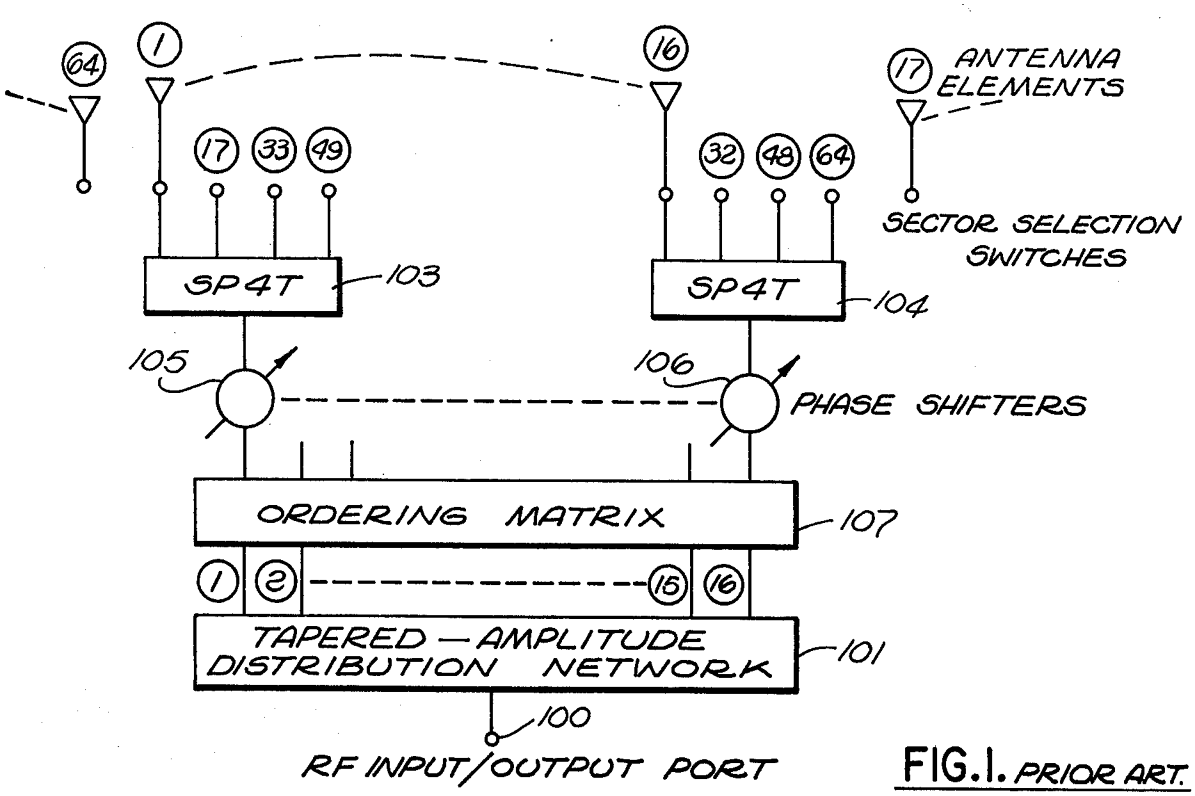
FIG.1. PRIOR ART.
FIG. 1 is a schematic block diagram illustrating the instrumentation of a prior art electronically scanned circular cylindrical array.

Referring now to FIG. 1, the general prior art configuration of the so-called switching-and-phasing technique aforementioned, is illustrated. An RF input-output port 10 functions as a terminal for transmitter energy in the transmitting mode and for a receiver connection in the receiving mode. Although most of the discussion in this description assumes that the devices described are being used in the transmitting mode, it is to be understood that all embodiments and variations are completely reciprocal and therefore operate in the reverse signal direction for receiving, without modification.

Figure 2:
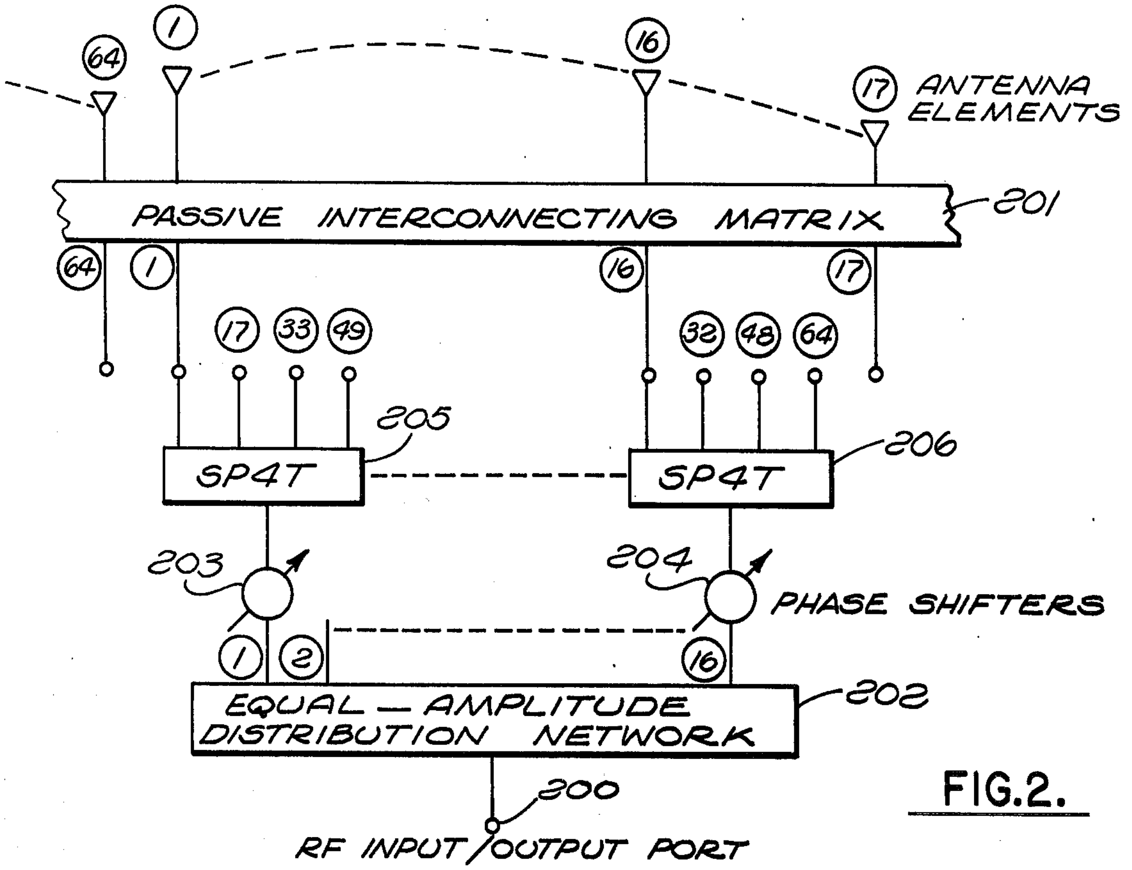
FIG. 2 is a schematic block diagram of a circular or cylindrical array excitation and beam control arrangement according to the present invention.

In FIG. 1 (and also in connection with FIG. 2 to be described hereinafter) an array of *n* circumferential elements (where *n* is, for example, 64) is assumed, these being identified in FIGS. 1 and 2 by encircled numerals. Corresponding encircled numerals also identify certain terminals or ports of the components to be described where these correspond to discrete antenna elements, as will be understood from the description hereinafter.

Proceeding with the description of FIG. 1, it has also been assumed that the circumferential elements of the array are broken into quadrant groups $q$. Thus, $q = 4$ if the array provides for a full 360° coverage. Of course, it is not a requirement, either in the prior art or in the system of the invention in respect to switching-and-phasing controlled electronically scanned circular or cylindrical arrays, that the elements be divided in that way for switching purposes. Actually, the sectors represented in the q groups may overlap, and moreover, it is not necessary that the system be implemented for a full 360° azimuth coverage. Of course, it is to be understood that the ability to provide random beam pointing within the full circle of azimuth is one of the more significant advantages electronically scan circular or cylindrical arrays.

In referring to circular or cylindrical arrays, it will be noted that the present invention deals primarily with azimuth beam pointing. If the array is circular or entirely within a single horizontal plane, directivity in azimuth may be provided, but elevation coverage is not basically directive unless reflectors or other expedients are included for elevation plane beam shaping.

It has been further assumed in this description, that the axis of the cylindrical array (or the center line of the circular array normal to the plane thereof) is substantially vertical.

Still further, the 64 elements circumferentially disposed about the array are treated as though they were individual radiators. Although it will be realized that in a cylindrical array the individual circumferential element port energy may be distributed among the individual radiators of a column of radiators stacked vertically in order to effect beam shaping in the elevation plane. Through additional structure, discrete elevation plane beam pointing or scanning at any predetermined azimuth beam location can also be provided. The manner in which the basic structure illustrated may be modified to provide for columns of radiators is evident from the disclosure of U.S. Pat. No. 3,653,057, or U.S. Pat. No. 3,474,446, although the latter does not deal with a discrete beam pointing system, nevertheless, the technique for exciting a column of radiators in a cylindrical array substantially as a single element in the azimuth plane is disclosed.

Hereinafter, it should be understood that, in dealing with the circumferential elements of the array, the intent is that these may be either single radiators of a circular array or columns of radiators comprising a cylindrical array.

Returning now to FIG. 1, the tapered amplitude distribution network 101 provides a distribution over the $n/q$ outputs of 101 for reasons well understood in the art. The factor $n/q$ is, in this case, 16, and accordingly there are 16 output ports from 101.

The sector of the array to be excited is chosen by a bank of single-pole, four-throw switches, typically 103 and 104. Phase shifters, also $n/q$ in number and typically illustrated at 105 and 106, collimate the beam and provide the fine scanning within the coarse beam positions selected by the said switches, of which 103 and 104 are typical. As these sector-selection switches rotate the excited portion of the aperture, the ordering matrix 107 must maintain the proper amplitude and phase order of the elements, for example, when element 1 is switched to number 17, corresponding to a change of quadrants, the corresponding feed line must take count of the fact that a change from the left to the right hand side of the aperture has occured. Furthermore, all other excited elements must obtain the amplitude that the adjacent element previously had. Thus, the ordering matrix 107 requires 32 transfer switches to provide this function. Of course, if amplitude is quantized in groups of two elements, the number of transfer switches required is reduced to 24, providing eight discrete levels of amplitude in lieu of a separate level for each of the sixteen elements in the quadrant. The resulting amplitude quantization sidelobes may be satisfactory with that simplification, however, even in that case, the ordering matrix 107 is a relatively complicated and expensive device.

Referring now to FIG. 2, the schematic block diagram of a combination of the present invention is presented. The passive interconnecting matrix 201 replaces the ordering matrix 107 of FIG. 1, and, since this device 201 inherently provides amplitude tapering over the projected aperture, the tapered amplitude distribution network of 101 becomes a simpler equal-amplitude distribution device 202, energized from an RF input-output port 200 connected into utilization devices in the same manner as applies to port 100 in FIG. 1. Accordingly, the 16 output ports of the device 202 all supply signals of equal amplitude and phase. Again, beam collimation and fine scanning or vernier beam pointing, is provided in accordance with a programmed setting of the 16 phase shifters, the latter being responsive to the outputs of 202. These phase shifters typically 203 and 204 are, of course, electrically controllable and adapted for programming to effect the scanning or random beam positioning of which the system is capable. The controllable phase shifter is so well known per se, in this art, that additional description is unnecessary.

From the outputs of these phase shifters of FIG. 2, 16 sector-selector switches, typically 205 and 206, are provided, these performing the same function as their corresponding elements in FIG. 1.

As hereinbefore indicated, the passive interconnecting matrix 201 which is responsive to the outputs of the sector-selector switches transmits the signals which have now been automatically ordered in amplitude and phase, to the antenna elements. Moreover, the matrix 201 inherently provides an appropriate amplitude taper by shaping (narrowing) the effective element pattern. Since the effective element pattern is disposed about the curvature of the array, the effective amplitude taper may be thought of as extant at a projected aperture, the latter lying in a plane normal to the radial bi-sector of the arc of excited elements. As hereinbefore indicated, the narrowing of the effective element pattern has a tapering effect on the amplitude when observed at this projected aperture.

Referring now to FIG. 4, a circuit for device 201 to provide the narrowing of the effective element pattern will be seen. For convenience, five of the array elements 401 through 405 have been identified. A radially outward level, or layer, of 3db hybrids in an interconnected network is identified at 407, 409 411 and 413, typically. A second level of hybrids interconnected therewith is identified at 406, 408, 410, 412 and 414, typically. In the case of the first, or radially outward level, the input-output ports are directly connected to corresponding array elements, whereas the branches are interconnected with the branches of the aforementioned second level hybrids. Of course, each of these hybrids includes an input-output port and two branches, each branch having a three db relationship to the said input-output terminal. These devices are, of course, known, per se, as individual components.

In the so-called two-level (or two layer) interconnecting network, only these two levels of hybrids are employed. Thus, the terminals, typically 422, 423, 424, 425, 426, etc., provide the terminals of the passive interconneting matrix 201 of FIG. 2 which are fed from the sector selection switches and the additional hybrids radially inward of these terminals are not present. In that event, it will be observed that input energy to the interconnecting network, for example, at 423, is split by hybrid 408 between the branches of hybrids 407 and 409 and accordingly, its energy is split between antenna (radiating) elements 401 and 402. Similarly, energy at 424 is split by hybrid 410 between the branches of hybrids 409 and 411 and therefore between antenna elements 402 and 403, respectively, etc. This arrangement provides the cosine amplitude taper as the effective amplitude indicated on FIG. 3. The interconnections involving element 404 and 405, and hybrids 413, 414 and 415 are similarly arranged, as can be seen from FIG. 4.

From the foregoing, it will be observed that feed applied at one of the terminals 422 through 426 is divided between two antenna elements. As a typical example, from 425, excitation is distributed, via hybrid 412, between hybrids 411 and 413 and therefore, between elements 403 and 404. The resultant amplitude taper on the projected aperture (FIG. 3) is approximately a "cosine on a pedestal". A corresponding azimuth first sidelobe level better than −21 db is obtained.

An extension of this network concept can be made to include additional hybrids, typically 427 through 431 fed by 432 through 435 typically. That arrangement provides terminals 436 through 439 as the feed ports. It will be noted that each of those terminals can distribute excitation to three antenna elements. Taking port 437 as an example, the feed passes through hybrid 433, 428, 429, 410, 412, 409, 411 and 413 to distribute excitation among antenna elements 402, 403 and 404.

Referring now to FIG. 5, an additional embodiment for the passive interconnecting matrix 201 will be described. Assuming the same five antenna elements, and the corresponding matrix feed ports, an interconnected arrangement for four-port matched combiners is shown in a back-to-back configuration comprising an outer row 501 through 505 and an inner row 506 through 510. Each individual combiner has an input/output terminal and three branches. Taking 508, for example, energy on the input/output port 511 is distributed among branches 512, 513 and 514. Branch 513 is also one branch of 503, but 503 is also energized from branches 515 of 507 and 516 of 509. Accordingly, the energy combined in 503 comes partially from 507, 508 and 509 and the corresponding matrix input ports (see FIG. 2).

The four-port combiner circuits are well known components per se, and may be implemented in strip line or waveguide form, for example. Moreover, the division ratio between the input/output port and the three branches may be varied to vary the shape of the aperture taper. If the center branch (513 of 508 for example) were a 3 db terminal with respect to 511 and 512 and 514 were 6 db terminals a cosine squared aperture taper could be obtained. It is also possible to provide for approximately 80% of the energy on each central branch (513 of 508 for example) and 10% each in branches 512 and 514, a cosine squared aperture taper, on pedestal can be obtained. Sidelobe levels can be held below −30 db in the arrangement of FIG. 5.

Although the described embodiments of the passive interconnecting matrix do introduce some power loss due to dissipation in the hybrid terminations (as high as 3 db in some cases); nevertheless this loss must be weighed against the circuit losses in the multilevel active ordering matrix of the prior art (FIG. 1), which can easily be on the order of 2 to 3 db.

Of course, modifications and variations can be made within the skills of this art, once the nature of the invention is understood, and it is therefore not intended that the scope of the invention should be considered limited by the drawings and this description, which are illustrative only.

What is claimed is:

1. A switching and interconnecting system for discretely exciting one of *q* groups comprising a fraction *n*/*q* contiguous elements of the total circumferentially arranged radiating elements *n* of an array of antenna elements extending over coupling least a portion of said circumference matrix producing a beam directive in the plane containing said circumference and for controllable coarse and fine pointing of said beam, comprising:

a passive interconnecting matrix having *n* output ports each connected discretely to a corresponding one of said *n* antenna elements and also having *n* feed ports, said matrix including a plurality of interconnecting hybrid devices for coupling energy extant at each of said matris feed ports to and from at least two contiguous radiating elements;

an equal-amplitude distribution network having a single RF input-output port and *n*/*q* distribution ports, said input-output port constituting the input-output terminal for said switching and interconnecting system;

*n*/*q* phase shifters, one of said phase shifters being connected to each of said distribution ports of said equal-amplitude distribution network to provide a set of *n*/*q* discretely phase shifted RF drive signals for producing a corresponding predetermined fine beam pointing angle;

and *n*/*q* single pole, *q* position selector switches each arranged for switching a corresponding one of said phase-shifted RF drive signals among the like-positioned elements in each of said *q* groups of elements discretely to provide said coarse beam positioning with respect to which said fine beam pointing is effected.

2. Apparatus according to claim 1 in which said hybrid devices within said interconnecting matrix comprises at least;

first level of $n$ 3 db hybrids each having a first terminal connected to a corresponding radiating element of said array and having second and third terminals between which energy at said first terminal is substantially equally proportioned, and a second level of $n$ 3 db hybrids having first terminals which constitute said feed ports of said matrix, each of the second and third terminals of each of said second level hybrids being connected discretely to one of said second and third terminals of said hybrids of said first level.

3. Apparatus according to claim 1 including additional 3 db hybrids in a network having first terminals which constitute said feed ports in lieu of said first terminals of said second level hybrids, each of the second and third terminals of each of said third level hybrids being connected discretely to one of said second and third terminals of said hybrids of said second level.

4. In an electronically scanned circular cylindrical array in which an element group comprising a plurality of contiguous circumferential antenna elements are excited by a set of RF signals in a predetermined phase relationship to generate a beam pattern in space at a corresponding pointing angle, the apparatus for providing amplitude taper across the aperture formed by said excited elements comprising:

an interconnecting matrix responsive to said set of RF signals, said matrix having a number of output and input ports equal to the number of said elements in said element group and the number of signals in said RF signal set; respectively;

and coupling means within said interconnecting matrix for apportioning energy present at each of said input ports among at least two adjacent elements of said element group to provide said amplitude taper.

5. Apparatus according to claim 4 in which the number of said input ports of said matrix is equal to the number of said output ports thereof.

6. Apparatus according to claim 5 in which said coupling means comprises a plurality of first level hybrid circuits each having an input-output port and two branches, at least the antenna elements within said group each connecting to the said input-output port of a corresponding one of said hybrids;

said coupling means further comprising a second level of hybrid circuits each having an input-output port and two branches, one branch of each of said second level hybrids being connected to one of said branches of said first level hybrids and the other branch of said same second level hybrid being connected to a branch of an adjacent first level hybrid, said second level hybrid input-output ports forming said input ports of said interconnecting matrix.

7. Apparatus according to claim 6 further comprising a third level of hybrids with the branches thereof connecting to the input-output ports of said second level hybrids in the same manner as the defined interconnections between said first and second level hybrids, the input-output ports of said third level hybrids thereby becoming the input ports of said interconnecting matrix.

8. Apparatus according to claim 6 in which said hybrids are further defined as having substantially a 3 db signal relationship between each of said branches and said hybrid input-output terminal.

9. Apparatus according to claim 7 in which said hybrids are further defined as having substantially a 3 db signal relationship between each of said branches and said hybrid input-output terminal.

10. Apparatus according to claim 4 in which said array is cylindrical with its axis substantially vertical, said beam pointing angle being measured in the horizontal plane.

11. Apparatus according to claim 6 in which said array is cylindrical with its axis substantially vertical, said beam pointing angle being measured in the horizontal plane.

12. Apparatus according to claim 7 in which said array is cylindrical with its axis substantially vertical, said beam pointing angle being measured in the horizontal plane.

* * * * *